US006437266B1

(12) United States Patent
Pannenborg et al.

(10) Patent No.: US 6,437,266 B1

(45) Date of Patent: Aug. 20, 2002

(54) ELECTRICAL CONTACT ARM ASSEMBLY FOR A CIRCUIT BREAKER

(75) Inventors: Erich John Pannenborg, San Juan, PR (US); Joseph Criniti, New Britain; Javier Ignacio Larranaga, Bristol, both of CT (US); Gerardo Rosario, Guaynabo, PR (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/667,728

(22) Filed: Sep. 22, 2000

(51) Int. Cl.[7] .................................................. H01M 1/02

(52) U.S. Cl. ........................................ 200/262; 200/275

(58) Field of Search ................................. 200/262–276; 361/115; 333/167–176

(56) References Cited

U.S. PATENT DOCUMENTS

| | | | | |
|---|---|---|---|---|
| 2,298,999 A | * | 10/1942 | Allen | 200/275 |
| 4,162,160 A | | 7/1979 | Witter | |
| 4,249,944 A | | 2/1981 | Witter | |
| 4,342,893 A | * | 8/1982 | Wolf | 200/270 |
| 4,375,021 A | | 2/1983 | Pardini et al. | |
| 4,733,211 A | | 3/1988 | Castonguay et al. | |
| 4,736,174 A | | 4/1988 | Castonguay et al. | |
| 4,757,294 A | | 7/1988 | Todaro | |
| 4,782,583 A | | 11/1988 | Castonguay et al. | |
| 4,789,848 A | | 12/1988 | Castonguay et al. | |
| 4,999,464 A | | 3/1991 | Bellino et al. | |

* cited by examiner

*Primary Examiner*—Lincoln Donovan

(74) *Attorney, Agent, or Firm*—David Arnold

(57) ABSTRACT

A contact arm assembly is provided having an electrical contact for making and breaking an electrical current, a contact arm for supporting the electrical contact, and a bond surface on the contact arm that is conditioned for improving the bond between the electrical contact and contact arm. Also provided is an electrical circuit breaker that utilizes the improved contact arm assembly. The bond surface of the contact arm is provided with pyramid-shaped serrations that serve to more uniformly distribute the electrical current during brazing, provide multiple areas of localized current constriction during brazing, and provide collector pockets for accumulating the molten braze alloy during brazing. The uniform distribution of electrical current during brazing serves to generate a uniform temperature gradient across the braze area for uniform melting of braze alloy. The multiple areas of localized current constriction during brazing serves to temporarily elevate the temperature of the braze joint during brazing by localizing the heat generation proximate the braze alloy, thereby effectively reducing annealing of the contact arm. The collector pockets for accumulating the molten braze alloy during brazing effectively eliminates the overflow of braze alloy onto the edges of the contact and contact arm. A contact arm assembly having uniform melting of braze alloy, reduced annealing of the contact arm, and reduced overflow of braze alloy onto the edges of the contact and contact arm results in an improved bond of contact to contact arm.

2 Claims, 8 Drawing Sheets

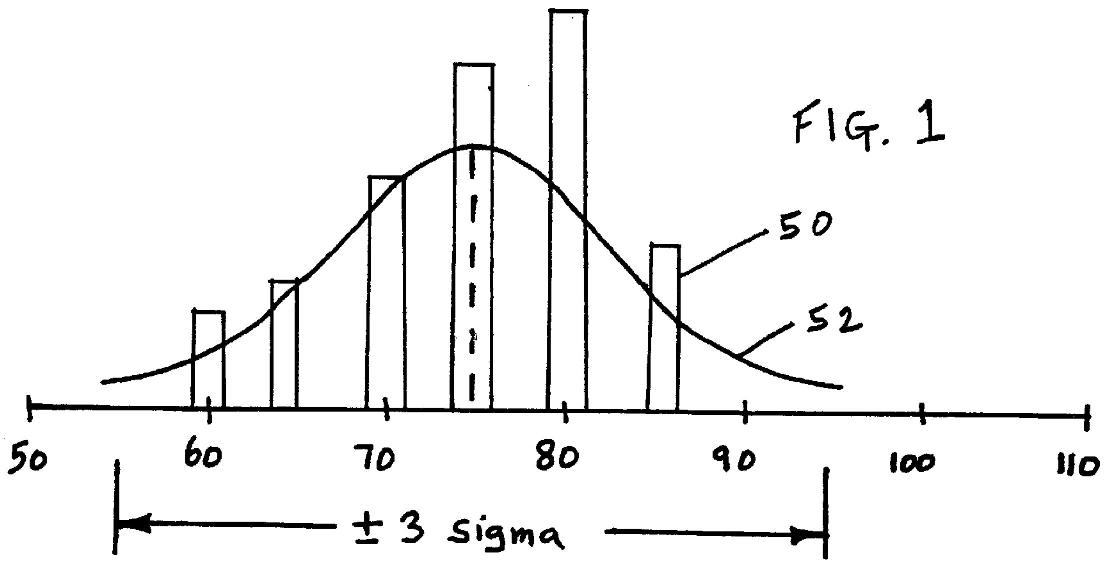
FIG. 1
FIG. 2
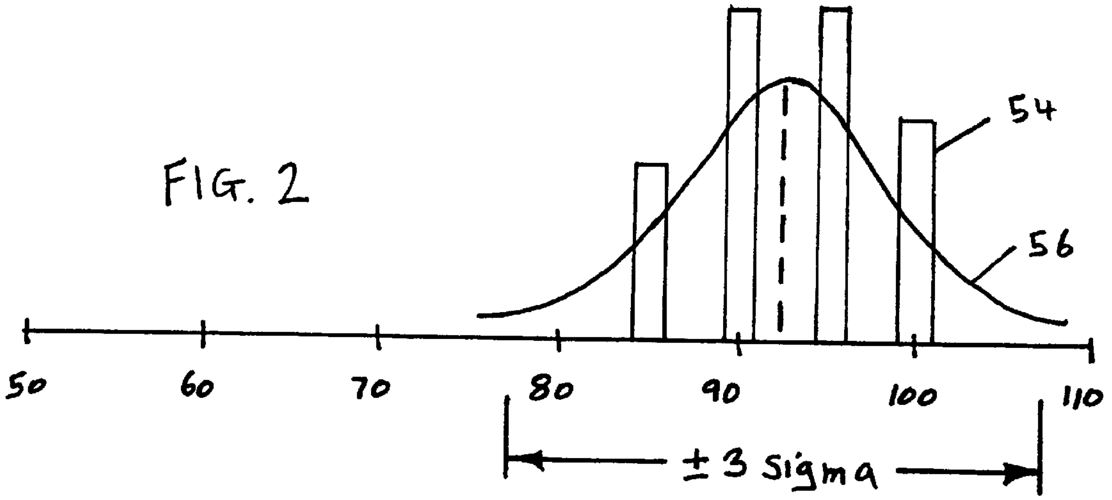

ELECTRICAL CONTACT ARM ASSEMBLY FOR A CIRCUIT BREAKER

BACKGROUND OF THE INVENTION

The present invention relates generally to a contact arm assembly having an electrical contact for making and breaking an electrical current in an electrical circuit breaker. Contacts and contact arm assemblies are well known in the art of circuit breakers. An example of an electrical contact suitable for circuit breaker applications is described in U.S. Pat. No. 4,162,160 entitled "Electrical Contact material and Method for Making the same." An example of a method of making an electrical contact material suitable for circuit breaker applications is described in U.S. Pat. No. 4,249,944 entitled "Method of Making Electrical Contact Material." Examples of contact arm assemblies suitable for circuit breaker applications is described in U.S. Pat. No. 4,999,464 entitled "Molded Case Circuit Breaker Contact and Contact Arm Arrangement".

Contact arm assemblies having electrical contacts for making and breaking an electrical current are not only employed in electrical circuit breakers, but also in other electrical devices, such as rotary double break circuit breakers, contactors, relays, switches, and disconnects. The applications that these electrical devices are used in are vast, and include, but are not limited to, the utility, industrial, commercial, residential, and automotive industries. The primary function of a contact arm assembly is to provide a carrier for an electrical contact that is capable of being actuated in order to separate the contact from a second contact and contact arm arrangement, thereby enabling the making and breaking of an electrical current in an electric circuit. Electrical contacts suitable for the noted applications are typically made of a silver impregnated material, such as, but not limited to; silver-tungsten, silver-tungsten-carbide, silver-nickel, silver-tin oxide, silver-cadmium oxide, silver-graphite, silver-molybdenum, silver-nickel-graphite, and silver-iron. However, the use of copper in place of silver may also be suitable for some lower current applications. The contact must be bonded to the contact arm, which is typically, but not necessarily, a copper alloy, in such a manner that the assembly will not disassemble during operation of the host device. The bonding method that is typically employed is brazing. The process of brazing electrical contacts to contact arms is well know to one skilled in the art and is fully described in Advanced Metallurgy's article entitled "Brazing Electrical Contacts" by Peter C. Murphy, published by Advanced Metallurgy, Inc., 1028 E. Smithfield Street, McKeesport, Pa. 15135 (July, 1987).

To facilitate the brazing process, contacts have been known to be manufactured with serrated detail on the back. The serrated detail on the back of the contact serves to retain the excess silver infiltrant and braze alloy that results during contact manufacturing, thereby providing a silver rich layer and a layer of braze alloy on the back of the contact for brazing. The resulting finished contact is substantially void of any serration pockets on the back since the silver infiltrant and braze alloy have substantially filled them in. Thus, the purpose of the serrated detail on the back of the contact is for contact manufacturing purposes and not for influencing current distribution during brazing. Serrated contacts are described in Advanced Metallurgy's article entitled "Serrated Backed Contacts" in their publication entitled "Advanced Metallurgy, Inc., Electrical Contacts and Assemblies", published by Advanced Metallurgy, Inc., 1028 E. Smithfield Street, McKeesport, Pa. 15135 (1987). Various contact manufacturing methods are also described in the aforementioned publication entitled "Advanced Metallurgy, Inc., Electrical Contacts and Assemblies".

In order to accommodate thermal limitations within an electrical device, the cross-sectional areas of the contact, contact arm, and bond area between contact and contact arm, typically increase as the ampacity rating of the contact arm assembly increases. While the cross-sectional areas of the contact and contact arm are readily determined by geometric measurements, the cross-sectional area of the bond surface between contact and contact arm is not so readily determined. Factors such as brazing temperature, brazing time, surface oxidation, brazing electrode geometry variations, and braze alloy geometry variations, can effect the percentage of bond area that is actually brazed, thereby effecting the ability of the brazed joint to withstand adiabatic heating at short circuit, and to withstand shear forces during mechanical opening and closing of the contacts. Thus, it would be beneficial to have an improved method of bonding an electrical contact to a contact carrier and an improved contact arm assembly resulting therefrom.

SUMMARY OF THE INVENTION

In an exemplary embodiment of the present invention, a contact arm assembly and method of making the same are provided having an improved bond between contact and contact arm, thereby enabling the contact arm assembly to withstand increased adiabatic heating and shear forces than would be possible without the improved bond. Also provided is an improved contact arm assembly in accordance with the present invention that also includes nickel metal arranged intermediate a silver-impregnated contact and a copper contact arm, thereby preventing intermixing between the copper and silver when the contact is bonded to the contact arm. Further provided is an electric circuit breaker having an improved contact arm assembly in accordance with the present invention, which enables the circuit breaker to perform according to specification when the contact arm assembly is subjected to increased adiabatic heating and shear forces. An alternative benefit of the present invention is to provide an improved contact arm assembly of a reduced size that is capable of withstanding the same adiabatic heating and shear forces as a contact arm assembly of normal size but with less effective bonding between contact and contact arm.

The improved bond between contact and contact arm is accomplished by conditioning the bond surface of the contact arm to produce a serrated finish. While there are many arrangements of serrated finishes that produce satisfactory results, the exemplary embodiment having a plurality pyramid-shaped serrations, or solid geometric saw-like projections, has been s improve the brazed connection between contact and contact arm. The serrated finish on the bond surface of the contact arm serves to more uniformly distribute the electrical current during brazing, provide multiple areas of localized current constriction during brazing, and provide collector pockets for accumulating the molten braze alloy during brazing. A more uniform distribution of electrical current across the contact-to-contact-arm interface during brazing produces a more uniform heat profile throughout the cross-sectional area of the braze alloy, thereby resulting in more uniform melting of the braze alloy. The multiple areas of localized current constriction across the contact-to-contact-arm interface serve to rapidly increase the interface temperature without excessively overheating the contact or contact arm, thereby resulting in rapid melting of the braze alloy while minimizing the degree of annealing experienced by the contact and contact arm. In normal contact-to-contact-arm brazing operations, where annealing of the copper contact arm occurs, the softened copper of the contact arm can result in deformation of the contact arm after the contact arm experiences repeated mechanical on-off impact loads, thereby reducing the term of usability of the contact arm and host device. Minimizing the degree of annealing experienced by the copper contact arm will avoid premature deformation of the contact arm, thereby enhancing the term of usability of the contact arm and host device as compared to a normal contact-to-contact-arm assembly employing a less effective brazing technique. Collector pockets created by the serration pattern provide the molten braze alloy with flow regions, areas defining the valleys of the collector pockets, across the entire bond area, thereby reducing the volume of excess braze flow that is expelled around the outer edge of the bond region. Excessive braze flow that is expelled around the outer edge of the bond region during brazing can weep down to the contact surface and cause undesirable tack welding of the contacts. The presence of collector pockets across the bond area of contact to contact arm significantly reduces the volume of braze alloy that is available to weep down to the contact surface, thereby eliminating the need for post-braze cleaning.

Although the bond surface of the silver impregnated contact has serration detail, as described above, the purpose of these serrations is to contain the excess silver infiltrant that results during contact manufacturing, and not to provide an array of current constriction points and collector pockets. Thus, the benefits described above arising from the serration pattern on the bond surface of the contact arm, are not achieved by the silver-filled serrations on the back of the silver impregnated contact. Furthermore, the serration pattern on the bond surface of the contact arm provides an improved contact-to-contact-arm bond with or without the serration detail on the back of the contact.

An alternate embodiment of the present invention is to include a layer of nickel between the serrated copper contact arm and the silver impregnated contact, which acts as a barrier to prevent the intermixing of copper and silver. By preventing the intermixing of copper and silver at the bond interface, the resulting bond interface is free of a copper-silver eutectic alloy, which has a melting point lower than that of the copper and the silver. Thus, a contact arm assembly having a serrated bond surface on the copper contact arm and a nickel layer between the copper contact arm and silver impregnated contact, provides a further improved bond by elevating the melt temperature of the bond interface above that of the copper-silver eutectic melt temperature.

BRIEF DESCRIPTION OF THE DRAWINGS

FIG. 1 is a graphical representation of experimental data reflecting the raw data and statistical distribution of effective bond surface area as a percentage of available surface area for a brazed joint according to prior art methods;

FIG. 2 is a graphical representation of experimental data reflecting the raw data and statistical distribution of effective bond surface area as a percentage of available surface area for a brazed joint in accordance with the present invention;

DESCRIPTION OF THE PREFERRED EMBODIMENT

Figure 3:
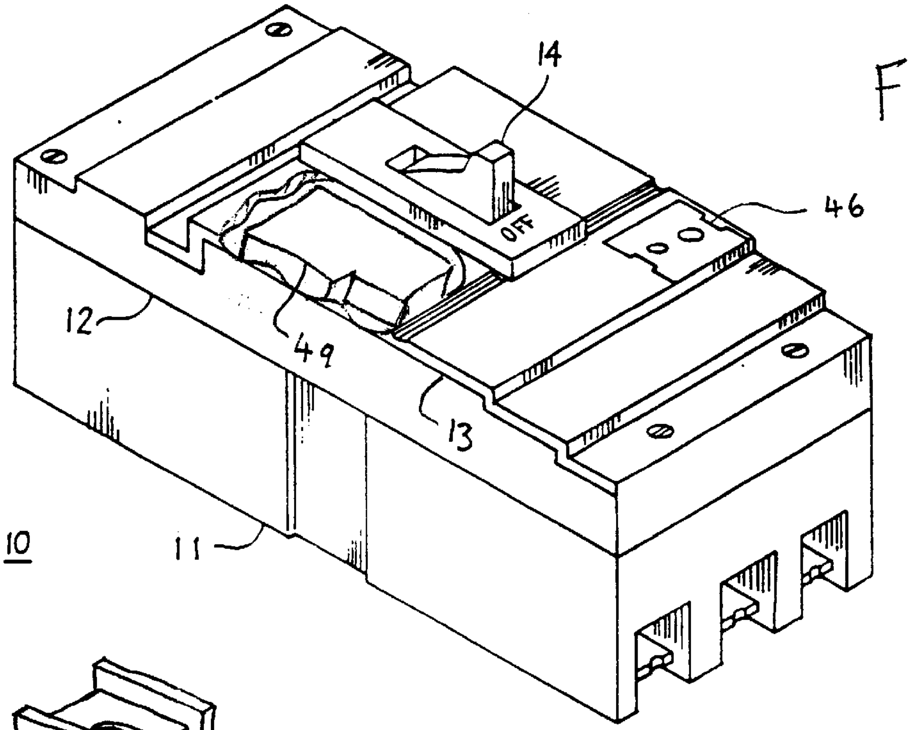
FIG. 3 is a partial cutaway isometric view of an electrical circuit breaker showing an actuator and containing an electrical contact arm assembly in accordance with the present invention.

Contact to Contact Arm Bond Surface Area Generally

FIGS. 1 and 2 depict graphical representations of experimental data reflecting the raw data and statistical distribution of effective bond surface area as a percentage of available surface area for a brazed joint according to prior art methods and for a brazed joint in accordance with the present invention, respectively. Brazed joints are typically designed to have a certain effective bond surface area, with an effective bond surface area of greater than 75% being desirable. The effective bond surface area is that part of the total geometric surface area available for brazing that has in fact bonded through alloying. Due to the presence of surface oxides, surface imperfections and varying heat gradients across the bond surface area, variations in the resultant percentage of effective bond surface area can and do occur. To overcome this degree of variability, over-sized brazed joints are employed. However, the present inventors discovered that this degree of variability can more effectively be overcome by employing the serration process of the present invention. As depicted in FIGS. 1 and 2, the present invention significantly improves the percentage of effective bond area resulting from a given available geometric surface area. The experimental data of FIGS. 1 and 2 were generated using a tungsten top electrode of about ⅝-in diameter, a carbon bottom electrode of about 1½-in diameter and typical brazing parameters, such as; about 80-lb electrode clamping force, about 3000-amps rms alternating current (60 hertz), about 3 pulses of about 39 electrical cycles of on time, and water cooling.

FIG. 1 depicts the raw data 50 and statistical distribution 52 of effective bond surface for a typical prior art non-serrated brazed assembly that results in a median effective bond surface area of roughly 75%, a minus three-sigma (sigma is representative of "standard deviation") value of roughly 54%, and a plus three-sigma value of roughly 96%.

FIG. 2 depicts the raw data 54 and statistical distribution 56 of effective bond surface for a serrated brazed assembly in accordance with the present invention that results in a median effective bond surface area of roughly 93%, a minus three-sigma value of roughly 78%, and a theoretical plus three-sigma value of roughly 108%. Of course, the plus three-sigma value of roughly 108% is merely a theoretical value since it is the result of a statistical calculation, and does not imply the possibility of producing an actual bond area greater than 100% of the available surface area. As shown in FIG. 2, the raw data 54 as obtained through experimentation does not exceed the 100% threshold.

The assemblies of both FIGS. 1 and 2 have the same geometric surface area available for brazing, but significantly different effective bond surface areas. As can be seen, if a minimum effective bond surface area of greater than 75% is desired, the process depicted by FIG. 2 will result in a greater acceptance level within a plus or minus three-sigma range.

Circuit Breaker and Contact Arm Assembly Generally

Figure 4:
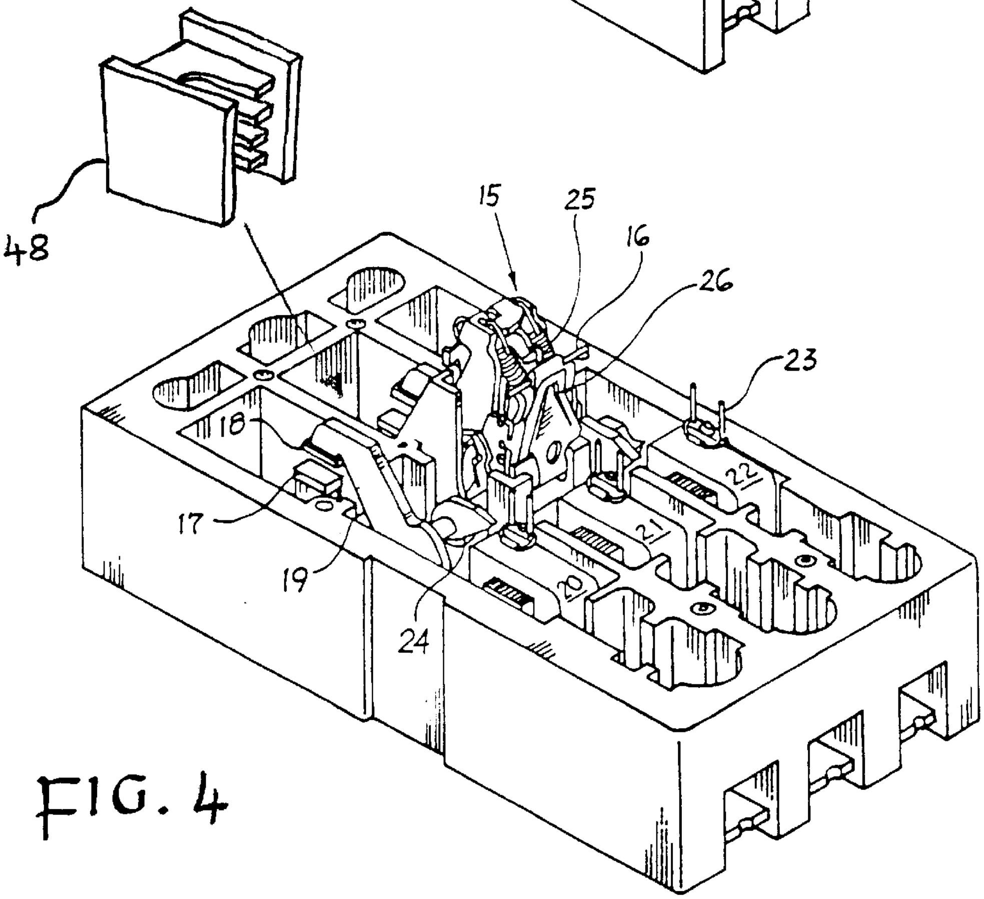
FIG. 4 is an isometric partial view of the electrical circuit breaker of FIG. 3 with the cover removed to depict the circuit breaker operating mechanism assembly.

Referring to FIG. 3, a current limiting circuit breaker 10 is depicted consisting of a case 11 to which a cover 12 is attached and which further includes an accessory cover 13. A circuit breaker operating handle 14 extends upward from a slot formed within the circuit breaker cover for manually turning the circuit breaker to its ON and OFF conditions. As described in U.S. Pat. No. 4,757,294, an actuator unit 49 interfaces with an operating mechanism 15 by means of a trip bar 16 to separate the circuit breaker fixed and movable contacts 17, 18, best seen by referring now to FIG. 4. The operating mechanism acts upon the movable contact arm 19 to drive the movable contact arm to the open position, shown in the circuit breaker 10 depicted in FIG. 4, upon the occurrence of an overcurrent condition of a predetermined magnitude. An arc extinguishing assembly 48 is located in base 10 in each of the three poles, or phases, proximate the stationary and movable contacts 17, 18 for controlling and extinguishing an electrical arc that is drawn between the stationary and movable contacts 17, 18 during an opening action. The circuit current is sensed by means of current transformers 20–22 which connect with the circuit breaker trip unit 46 by means of upstanding pins as indicated at 23. A molded plastic crossbar arrangement 24, such as described in U.S. Pat. Nos. 4,733,211 and 4,782,583, insures that the movable contact arms operate in unison when the operating mechanism is articulated. The operating mechanism is held against the bias of a pair of powerful operating springs 25 by means of a latch assembly 26, such as described in U.S. Pat. Nos. 4,736,174 and 4,789,848. In order to provide the current limiting functions described earlier, the movable contact arms are adapted for independent movement from the crossbar assembly by electrodynamic repulsion acting on the movable contact arm itself. One such example of a current limiting circuit breaker is found within U.S. Pat. No. 4,375,021, which should be reviewed for its teachings of electrodynamic repulsion of a movable contact arm under intense overcurrent conditions through the circuit breaker contacts.

When such intense overcurrent conditions occur, it is important that the movable contact arms maintain good electrical contact with the contact arm supports while the movable contacts move away from the fixed contacts. The movable contact assembly 27 shown in FIG. 5 has a pair of shunt plates 28, arranged on either side of the movable contact arm as well as the parallel braided shunt conductor 29 for providing the necessary electrical contact between movable contact arm 19 and contact arm support 30. The shunt conductor is welded or brazed to the movable contact arm 19 at one end and is similarly attached to the contact arm support 30 at the opposite end. The movable contact arm includes a central body part through which a through-hole 31 is formed and an extended forward part 32 to the end of which the movable contact 18 is attached by the method to be described below in greater detail. The movable contact arm 19 is positioned within the circuit breaker case by means of a support base 33 which includes integrally-formed upstanding support arms 34, 35. The base 33 is tempered in order for the support arms 34, 35 to resiliently capture the movable contact arm 19 in a tight press-fit relation to promote good electrical conduction between the support arms 34, 35 and the movable contact arm 19. A through-hole 36 formed within the support base 33 allows for the electrical connection of the support base 33 with the circuit breaker load strap (not shown). The provision of an elongated slot 37 within the support base 33 intermediate the upstanding support arms 34, 35 allows for the flex of the support arms 34, 35 when the movable contact arm 19 is inserted. When the movable contact arm 19 is positioned within the support arms 34, 35, the through-hole 31 in the movable contact arm 19 aligns with corresponding through-holes 39 formed within the support arms 34, 35. A pivot pin 40 is next inserted within the through-holes 39 which are slightly oversized to permit rotation of the contact arm 19, and within through-hole 31 in a press-fit relation. The clearance provided between the through-holes 39 within the support arms 34, 35 and the ends of the pivot pin 40 allows the movable contact arm 19 to freely rotate within the support arms 34, 35 while maintaining good mechanical and electrical connection between the pivot pin 40 and the movable contact arm 19. It is important to maintain good electrical contact between the pivot pin 40 and the movable contact arm 19 while the contact arm rotates between its closed and open position in order to deter local ionization and pitting between the contact arm 19 and the pivot pin 40. The shunt plates 28 which are formed of a conductive material, such as copper or aluminum alloys, are shaped to include bifurcated arms 41, 42 extending from an angled base 43. Openings 44 are formed within the bifurcated ends 41, 42 of the shunt plates 28 for supporting the shunt plates 28 on the ends of the pivot pin 40. A U-shaped contact spring 45 is next positioned over the shunt plates 28 to further promote electrical connection between the shunt plates 28, support arms 34, 35 and the movable contact arm 19. Upon the occurrence of an intense overcurrent condition, such as a short circuit, the current path between the shunt plates 28 and the pivot pin 40 becomes divided between the bifurcated arms 41, 42. The resulting parallel current path through the bifurcated arms 41, 42 electrodynamically drives the bifurcated arms 41, 42 against the ends of the pivot pin 40 to maintain good electrical contact under intense short circuit overcurrent conditions. The good electrical conduction between the contact arm 19, pivot pin 40 and support arms 34, 35 insures that no localized arcing and pitting will occur. The shunt plates 28 share the circuit current with the shunt braid conductor 29 such that no pitting occurs between the pivot pin 40, support arms 34, 35 and the movable contact arm 19 even under such intense short circuit conditions.

Figure 6:
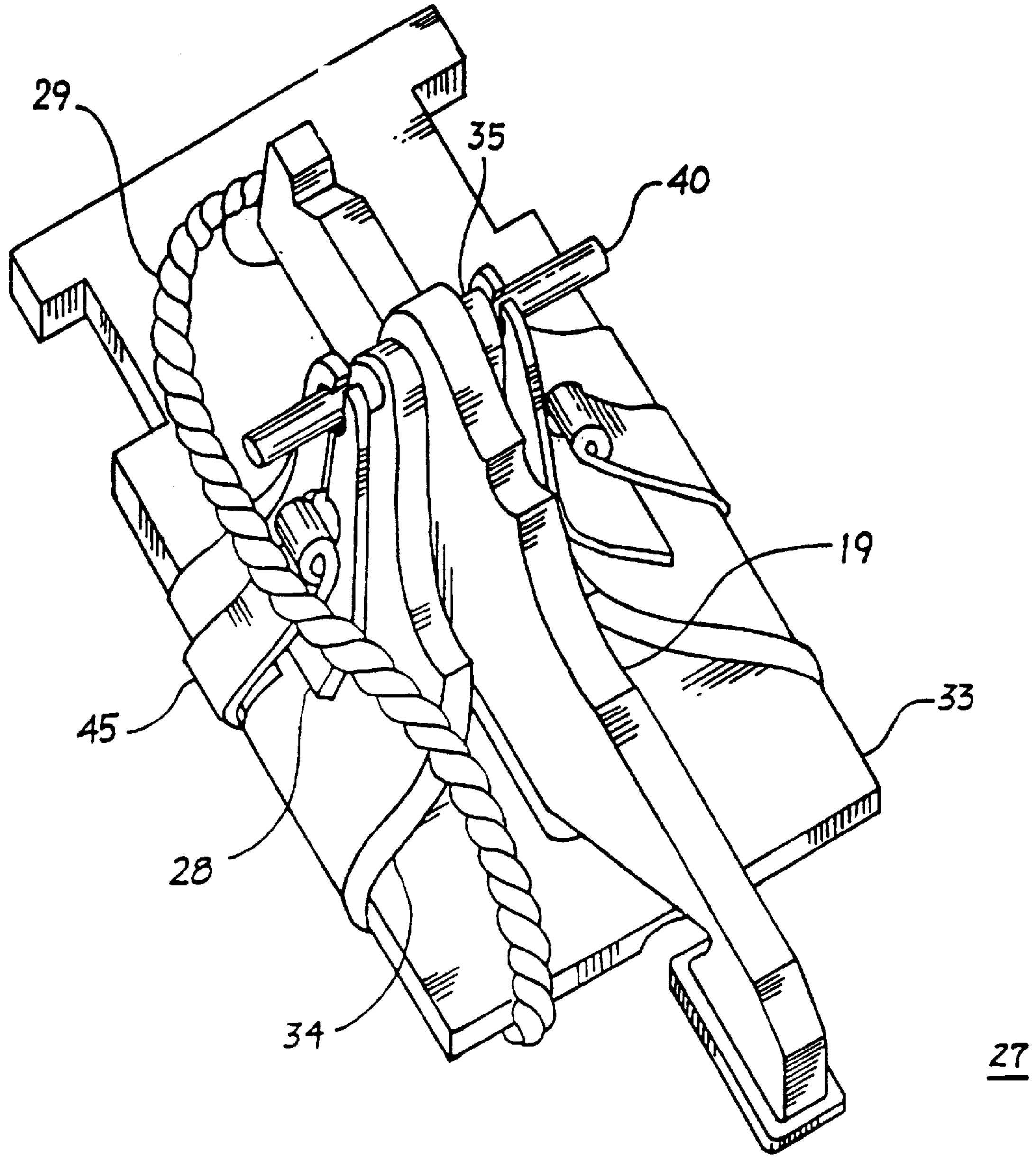
FIG. 6 is an enlarged isometric view of the electrical contact arm and pivot assembly depicted in FIG. 5.

The movable contact arm assembly 27 is depicted in FIG. 6 to show how the shunt plates 28 are forced against the support arms 34, 35, by the bias provided by the U-shaped contact spring 45. The pivot pin 40 is shown extending through the movable contact arm 19, the support arms 34, 35 and the shunt plates 28. Also depicted is the shunt braid conductor 29 that cooperates with the shunt plates 28 to provide parallel current paths between the movable contact arm 19 and the support 33 as described earlier.

Contact to Contact Arm Bond

Figure 5:
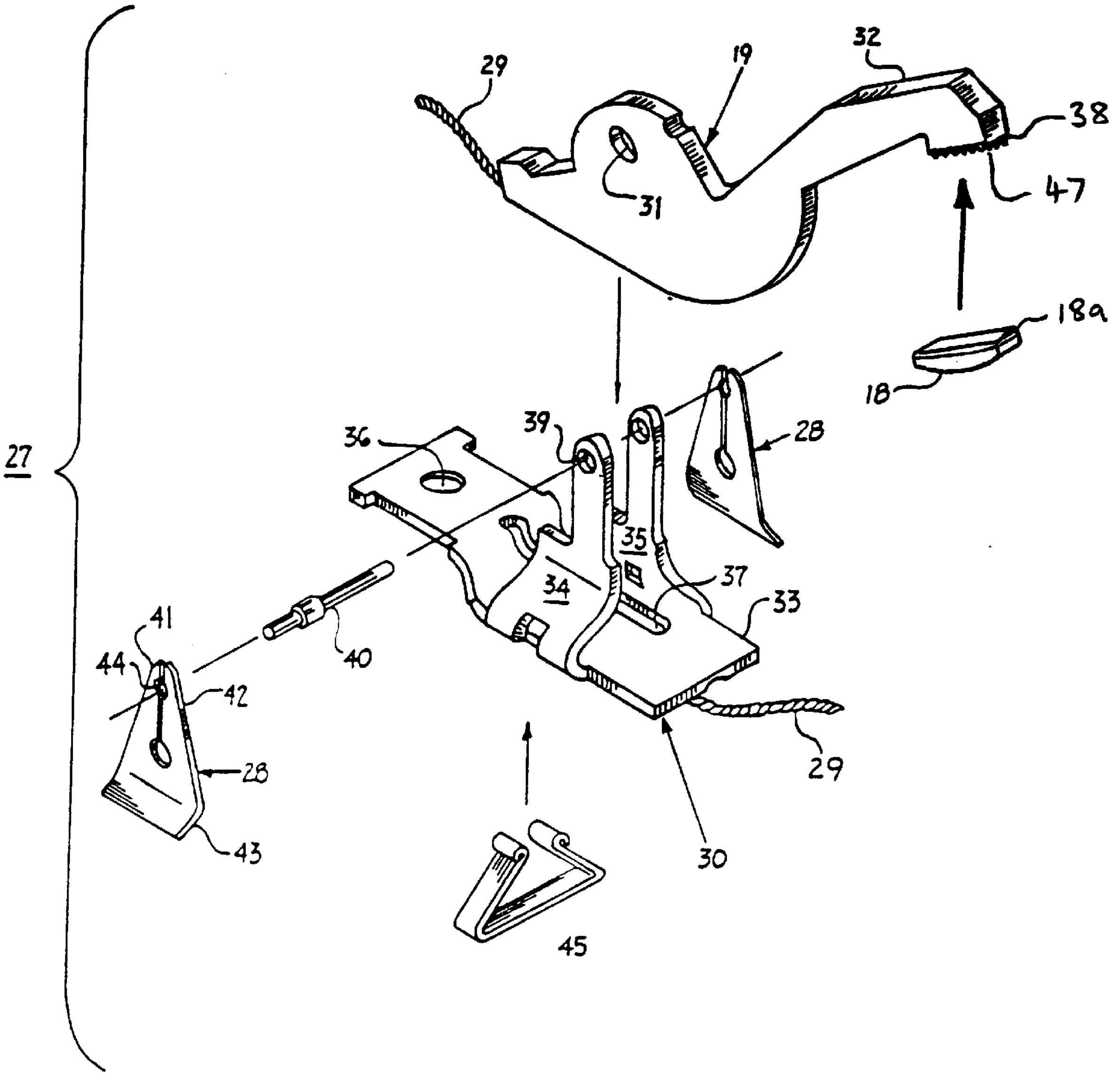
FIG. 5 is an exploded isometric view of an electrical contact arm and pivot assembly used within the circuit breaker depicted in FIG. 3.
Figure 7:
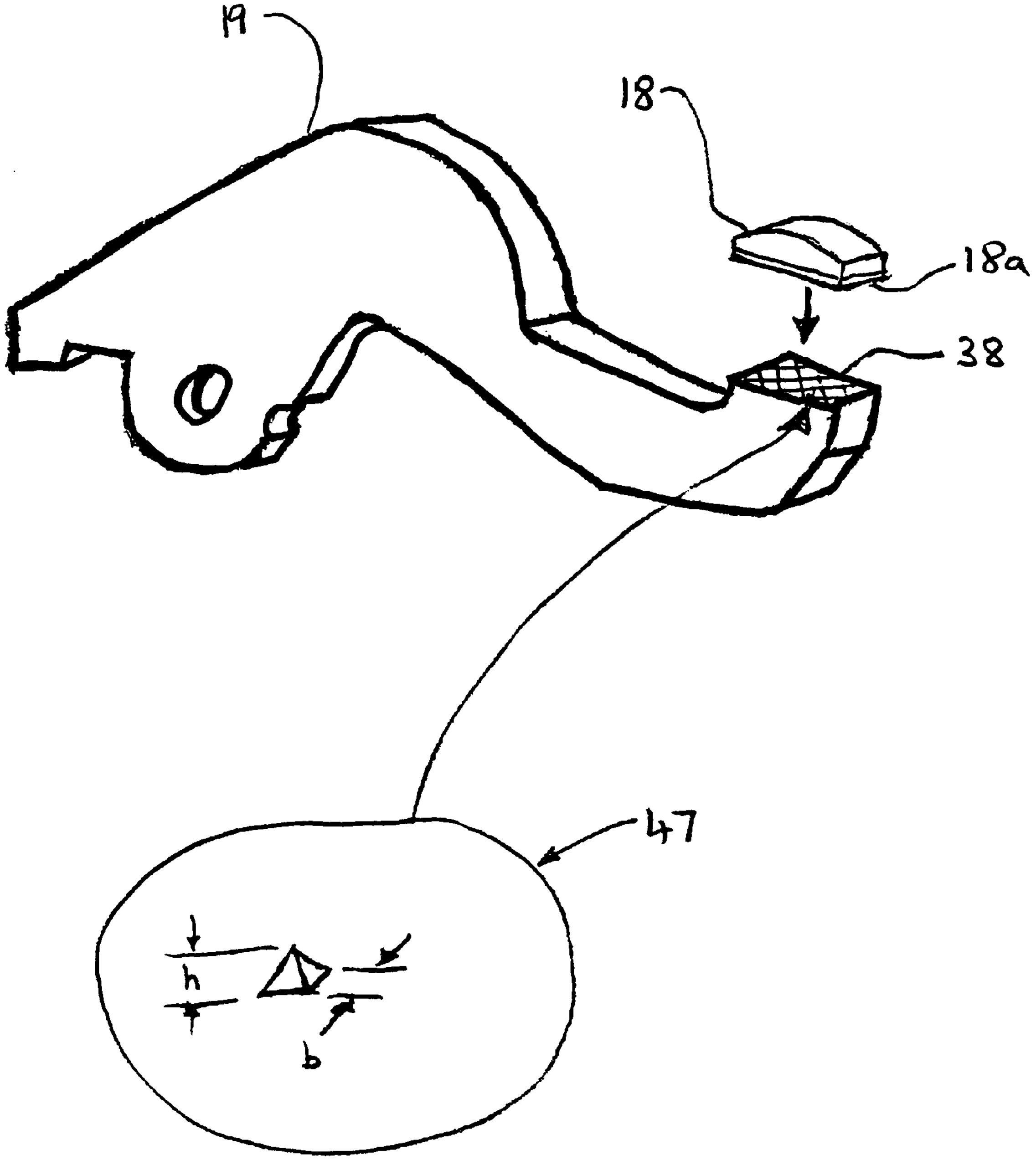
FIG. 7 is an exploded isometric view of an electrical contact arm assembly showing a solid geometric shaped projection in accordance with the present invention.

In accordance with the teachings of the present invention, the movable contact arm 19 is provided with a stippled, or serrated, bond surface 38, as best seen by referring to FIGS. 5 and 7. An exemplary arrangement of stippling, or serrations, on bond surface 38 is depicted by pyramid-shaped projections 47, having a base dimension “b” and height dimension “h”. While only one projection 47 is shown, it will be appreciated that the bond surface 38 contains a plurality of projections 47 to create the serrated bond surface 38. The base "b" and height "h" dimensions are typically between 0.002 inches and 0.200 inches, preferably between 0.005 inches and 0.100 inches, and most preferably between 0.010 inches and 0.030 inches.

While the projection 47 is shown to be pyramid-shaped with a base dimension "b" and height dimension "h", it will be appreciated that any solid geometric shaped projection having the function of discretely distributing the electrical current over the bond area during brazing, providing multiple areas of localized current constriction during brazing, and providing collector pockets for accumulating the molten braze alloy during brazing, will be functionally equivalent to a pyramid-shaped projection shown. For example, FIGS. 9*a–g* depict other shapes or patterns that would be suitable for achieving the functional equivalent of the pyramid-shaped projection. The solid geometric shapes depicted in FIGS. 9*a–g* are known as; hemisphere, spherical cap, right circular cylinder, cylinder of a cross-sectional area, right circular cone, frustum of right circular cone, and rectangular parallelepiped, respectively.

Figure 10:
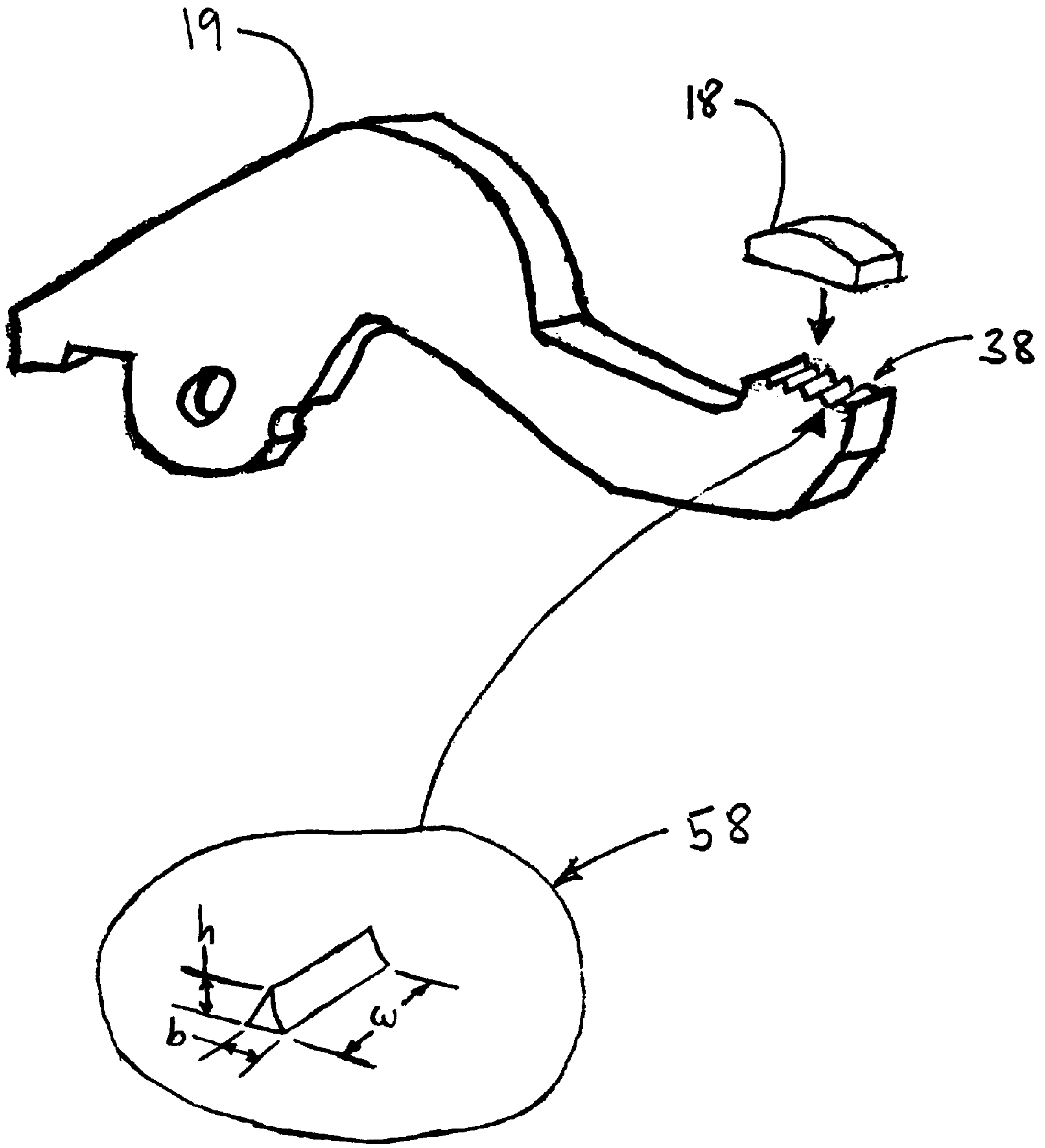
FIG. 10 is an exploded isometric view of an alternate electrical contact arm assembly showing a solid geometric extruded projection in accordance with the present invention.

Additionally, an extruded solid geometric shaped projection 58, as shown in FIG. 10, across the bond surface 38 of the contact arm 19 will also provide discrete distribution of the electrical current during brazing, localized current constriction during brazing, and collector pockets for accumulation of molten braze alloy. However, it will be appreciated that an extruded solid geometric shaped projection will not provide as many discrete points of contact as will individual solid geometric shaped projections, and will therefore provide only an incremental improvement over the prior art. The "b" and "h" dimensions shown in FIG. 10 correspond to the "b" and "h" dimensions shown in FIG. 7, and the "w" dimension shown in FIG. 10 corresponds to the width of bond surface 38 on contact arm 19.

Referring now to FIGS. 5–7, a bond layer 18*a* on movable contact 18, which typically comprises a braze alloy, facilitates bonding of movable contact 18 to contact arm 19. During brazing of movable contact 18 to contact arm 19, serrations 47 abut bond layer 18*a,* thereby discretely distributing the electrical current over the bond area, providing multiple areas of localized current constriction, providing collector pockets for accumulating the molten braze, and resulting in a more uniform bond. The reader will appreciate that the number of discrete projections on the bond surface of the contact arm will influence the outcome of the braze process. For example, thousands of projections per square inch over the bond surface will approach the functional equivalence of a planar bond surface, thereby negating the benefit of the projections, and a single projection over the bond surface will negate entirely the benefit of multiple projections. Thus, a reasonable number of projections are needed in order to shift the effective bond surface area from that depicted in FIG. 1 to that depicted in FIG. 2. Such a reasonable number of projections can be achieved by employing the "b" and "h" dimensions as discussed above.

Alternate Embodiment of Contact to Contact Arm Bond

In accordance with the further teachings of the present invention, the movable contact arm 19 is first plated with a coating of nickel in order to prevent any silver from transferring from the movable contact 18 to the movable contact arm 19 during the brazing operation. The nickel interface between the copper movable contact arm 19 and the silver impregnated tungsten-carbide contact 18 increases the temperature at which the contact 18 attaches to the contact arm 19 due to the higher melting point of the nickel than that of either silver or copper. The nickel coating thereby prevents the formation of a copper-silver eutectic and thereby substantially increases the temperature at which the contact would loosen and become detached from the movable contact arm. An acid flux is used to provide clean metallic surfaces during the welding or brazing operation. In some high current circuit applications, it is helpful to nickel plate the side of the contact 18 that is welded to the contact arm 19 and thereby promote a nickel to nickel weld. In other circuits, coating the surface of the contact 18 alone is sufficient to deter the transfer of silver out from the tungsten carbide matrix such that the copper movable contact arm 19 is not nickel plated. When the contact arm 19 is nickel plated, it is immersed in either an electroless or electrolytic nickel plating solution in which the nickel is applied to a minimum thickness of 0.1/1000 of an inch.

When electrolytic nickel plating solutions such as nickel chloride and nickel sulfamate are employed, electrodeposited nickel coatings having good tensile strength are obtained. Other methods of depositing nickel to selected regions of the contact arm, such as plasma spray and vapor deposition techniques, can be employed in high speed manufacturing processes.

Figure 8:
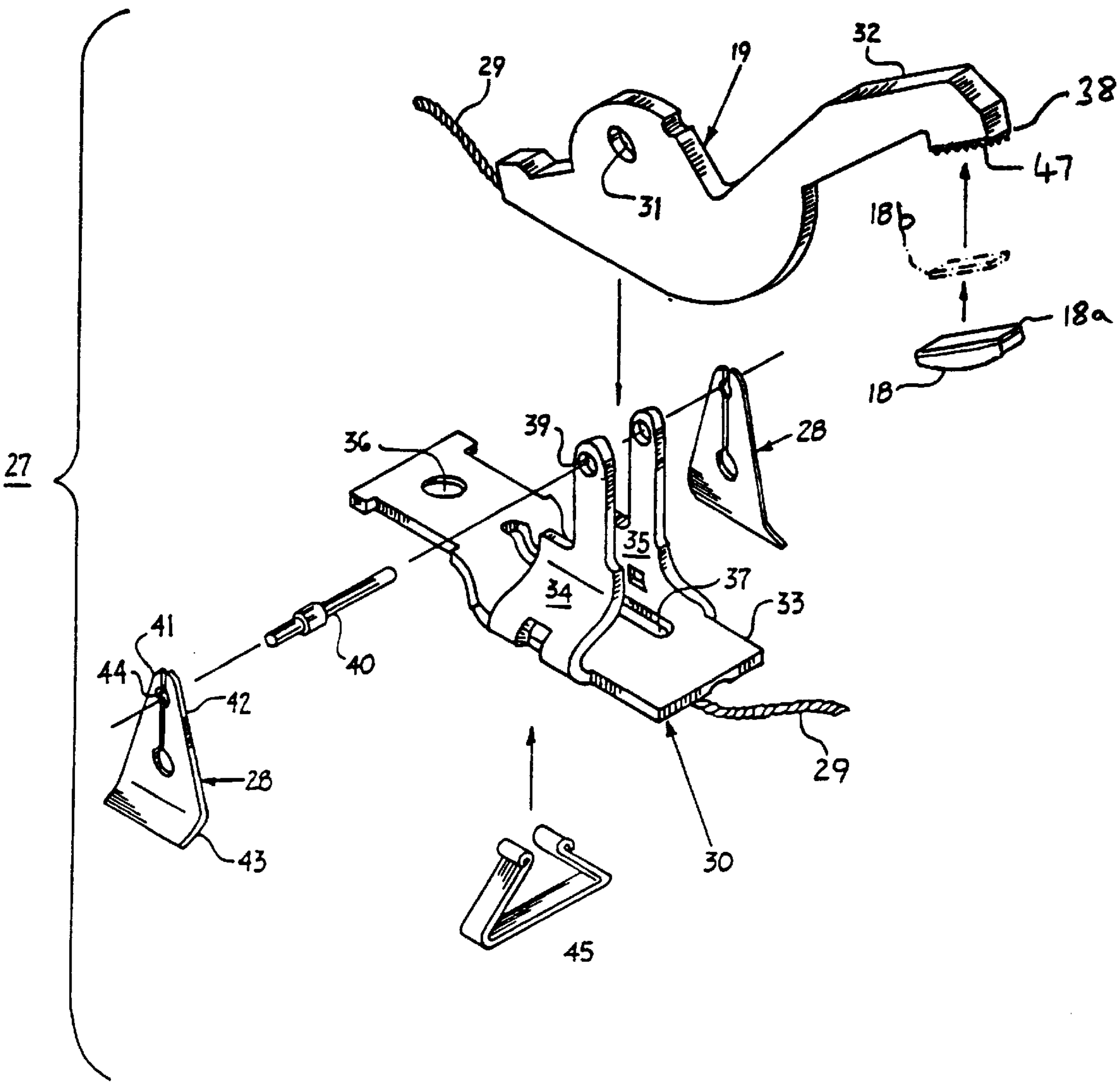
FIG. 8 is an exploded isometric view of an alternative embodiment of an electrical contact arm and pivot assembly used within the circuit breaker depicted in FIG. 3.
Figure 9A:
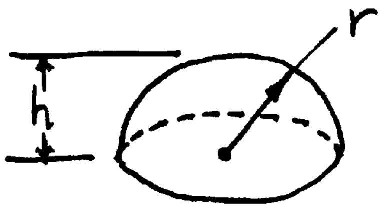
FIGS. 9*a–g* are isometric views of alternate embodiments of solid geometric shaped projections as depicted in FIG. 7.
Figure 9B:
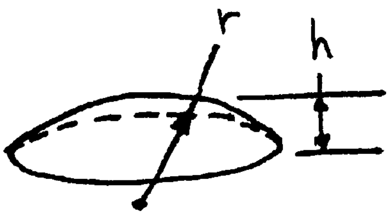
Figure 9C:
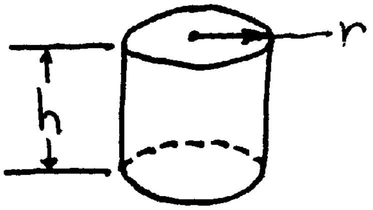
Figure 9D:
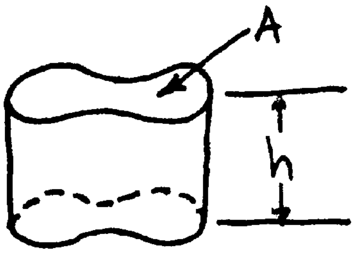
Figure 9E:
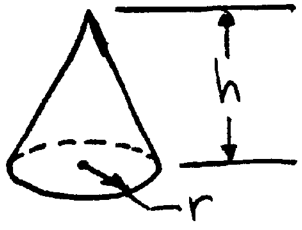
Figure 9F:
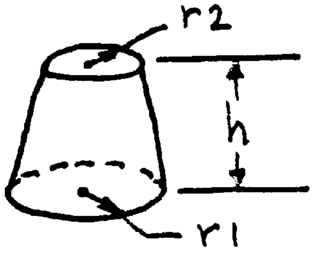
Figure 9G:
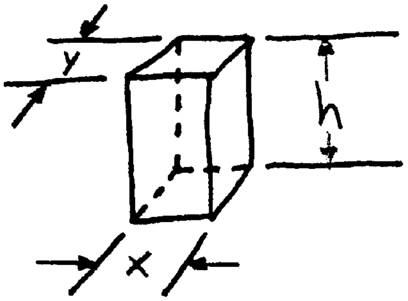

In the event that neither the contact 18 nor the contact arm 19 is nickel plated, a thin disc of nickel or an alloy of nickel as indicated at 18*b* in phantom in FIG. 8 is interposed between the silver impregnated tungsten-carbide contact 18 and the copper contact arm 19 to deter the formation of the silver-copper eutectic.

The combination of the nickel interface, depicted as 18*b,* and the serrations 47 further enhances the bond of contact 18 to contact arm 19 by elevating the melt temperature of the bond interface above that of the copper-silver eutectic melt temperature. The effective bond surface as depicted in FIG. 2 is representative of a contact arm assembly having a serrated bond surface on the contact arm, regardless of whether there is a nickel interface or not. However, as mentioned earlier the nickel interface produces a brazed joint with a higher melt temperature as compared to a brazed joint without a nickel interface.

What is claimed is:

1. A molded case circuit breaker comprising;

at least one pair of electrical contacts for making and breaking an electrical current and for supporting an electrical arc therebetween, said at least one pair of electrical contacts having at least one movable contact;

a means for mechanically and electrically connecting to a power source;

a means for mechanically and electrically connecting to a protected circuit;

at least one contact arm disposed between said power source connecting means and said protected circuit connecting means for moving said at least one movable contact;

a trip unit operatively connected to said protected circuit connecting means for transmitting a signal to initiate a trip action to open said at least one pair of electrical contacts upon the existence of an overcurrent condition;

an operating mechanism operatively connected to said trip unit and said at least one contact arm for responding to said signal from said trip unit to open said at least one pair of electrical contacts when an overcurrent condition exists;

an arc extinguishing assembly for extinguishing an electrical arc drawn between said at least one pair of electrical contacts as said at least one pair of electrical contacts open due to the trip action initiated by said trip unit;

a case for partially enclosing and supporting said circuit breaker components;

a cover connecting to said case for substantially completing the enclosure of said circuit breaker components;

an operating handle operatively connected to said operating mechanism and extending through said cover for manually operating said at least one pair of electrical contacts between an open and closed position; wherein said at least one movable contact having a first surface for making and breaking an electric current, said at least one contact arm having a bonding surface for supporting said at least one movable contact, said at least one movable contact having a second surface for attaching said at least one movable contact to said bonding surface of said at least one contact arm, and said bonding surface of said at least one contact arm having a plurality of projections for bonding to said second surface of said at least one movable contact.

2. The molded case circuit breaker of claim 1 wherein said at least one contact arm comprises copper and said at least one movable contact comprises silver alloy, and further comprising a nickel metal interface arranged intermediate said bonding surface of said at least one contact arm and said second surface of said at least one movable contact, thereby preventing intermixing between said silver alloy and said copper when said at least one movable contact is attached to said at least one contact arm.

* * * * *